(12) United States Patent
Seidel et al.

(10) Patent No.: US 11,104,797 B2
(45) Date of Patent: Aug. 31, 2021

(54) COMPOSITION AND THERMOPLASTIC MOLDING COMPOUND HAVING GOOD LOW-TEMPERATURE TOUGHNESS, HIGH GLOSS, AND HIGH PROCESSING STABILITY

(71) Applicant: Covestro Deutschland AG, Leverkusen (DE)

(72) Inventors: Andreas Seidel, Dormagen (DE); Sven Hobeika, Solingen (DE); Ralf Hufen, Duisburg (DE); Thomas Eckel, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 31 days.

(21) Appl. No.: 16/474,375

(22) PCT Filed: Dec. 22, 2017

(86) PCT No.: PCT/EP2017/084284
§ 371 (c)(1),
(2) Date: Jun. 27, 2019

(87) PCT Pub. No.: WO2018/122140
PCT Pub. Date: Jul. 5, 2018

(65) Prior Publication Data
US 2019/0345328 A1 Nov. 14, 2019

(30) Foreign Application Priority Data
Dec. 28, 2016 (EP) ..................................... 16207059

(51) Int. Cl.
*C08L 69/00* (2006.01)
(52) U.S. Cl.
CPC .......... *C08L 69/00* (2013.01); *C08L 2205/025* (2013.01); *C08L 2205/03* (2013.01); *C08L 2205/035* (2013.01)
(58) Field of Classification Search
CPC .......... C08L 69/00; C08L 25/12; C08L 25/14; C08L 55/02; C08L 51/04; C08L 67/02; C08L 2205/035; C08L 2205/03
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,148,172 A | 9/1964 | Fox |
| 3,271,367 A | 9/1966 | Schnell et al. |
| 3,600,465 A * | 8/1971 | Knapp .................. C08F 220/44 525/86 |
| 3,692,744 A | 9/1972 | Rich et al. |
| 3,879,348 A | 4/1975 | Serini et al. |
| 4,176,224 A | 11/1979 | Bier et al. |
| 4,596,851 A | 6/1986 | Lindner et al. |
| 4,885,335 A | 12/1989 | Gallucci et al. |
| 4,982,014 A | 1/1991 | Freitag et al. |
| 5,097,002 A | 3/1992 | Sakashita et al. |
| 5,340,905 A | 8/1994 | Kühling et al. |
| 5,717,057 A | 2/1998 | Sakashita et al. |
| 6,596,840 B1 | 7/2003 | Kratschmer et al. |
| 6,740,730 B1 | 5/2004 | Kratschmer et al. |
| 6,747,078 B1 | 6/2004 | Eckel et al. |
| 7,071,284 B2 | 7/2006 | Kauth et al. |

(Continued)

FOREIGN PATENT DOCUMENTS

| | | |
|---|---|---|
| CN | 102051034 A | 5/2011 |
| DE | 1247665 B | 8/1967 |

(Continued)

OTHER PUBLICATIONS

International Search Report for PCT/EP2017/084282 dated Apr. 3, 2018.

(Continued)

*Primary Examiner* — Jeffrey C Mullis
(74) *Attorney, Agent, or Firm* — Faegre Drinker Biddle & Reath LLP

(57) ABSTRACT

The invention relates to a composition for production of a thermoplastic moulding compound, wherein the composition comprises or consists of the following constituents:

A) 30% to 90% by weight of at least one polymer selected from the group consisting of aromatic polycarbonate, aromatic polyester carbonate and aromatic polyester, B) 5% to 65% by weight of polymer free of epoxy groups, consisting of B1) rubber-modified vinyl (co)polymer prepared by the emulsion polymerization method using a redox initiator system consisting of an organic oxidizing agent and a reducing agent and B2) optionally rubber-free vinyl (co)polymer, C) 0.5% to 10% by weight of a polymer containing structural elements deriving from styrene and an epoxy-containing vinyl monomer, D) 0% to 20% by weight of one or more further additives, wherein component C has a weight ratio of structural elements deriving from styrene to those deriving from epoxy-containing vinyl monomer of 1:100 to 1:1, and to a process for producing a moulding compound from the composition, to the moulding compound itself, to the use of the composition or the moulding compound for production of mouldings, and to the mouldings themselves.

20 Claims, No Drawings

(56) References Cited

U.S. PATENT DOCUMENTS

| | | | |
|---|---|---|---|
| 2004/0132905 A1* | 7/2004 | Eichenauer | C08K 5/523 525/63 |
| 2008/0194756 A1 | 8/2008 | DeRudder | |
| 2010/0168315 A1* | 7/2010 | Park | C08L 55/02 524/504 |
| 2015/0083297 A1* | 3/2015 | Inata | C08L 61/12 152/450 |
| 2018/0022935 A1* | 1/2018 | Uhlianuk | B05D 3/102 427/178 |
| 2021/0047512 A1* | 2/2021 | Eckel | C08L 69/00 |

FOREIGN PATENT DOCUMENTS

| | | |
|---|---|---|
| DE | 1269360 B | 5/1968 |
| DE | 1900270 A1 | 11/1969 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2407674 A1 | 10/1974 |
| DE | 2407776 A1 | 9/1975 |
| DE | 2715932 A1 | 10/1978 |
| DE | 3413751 A1 | 10/1985 |
| DE | 3832396 A1 | 2/1990 |
| DE | 19828538 A1 | 12/1999 |
| EP | 0375941 A2 | 7/1990 |
| EP | 0549205 B1 | 6/1993 |
| EP | 1069156 B1 | 10/2003 |
| EP | 1854842 B1 | 11/2007 |
| FR | 1561518 A | 3/1969 |
| GB | 1122003 A | 7/1968 |
| GB | 1229482 A | 4/1971 |
| GB | 1367790 A | 9/1974 |
| GB | 1464449 A | 2/1977 |
| WO | WO-200105866 A1 | 1/2001 |
| WO | WO-200105867 A1 | 1/2001 |
| WO | WO-2004063249 A1 | 7/2004 |

OTHER PUBLICATIONS

International Search Report for PCT/EP2017/084284 dated Mar. 26, 2018.

Written Opinion of the International Searching Authority for PCT/EP2017/084282 dated Apr. 3, 2018.

Written Opinion of the International Searching Authority for PCT/EP2017/084284 dated Mar. 26, 2018.

* cited by examiner

COMPOSITION AND THERMOPLASTIC MOLDING COMPOUND HAVING GOOD LOW-TEMPERATURE TOUGHNESS, HIGH GLOSS, AND HIGH PROCESSING STABILITY

CROSS-REFERENCE TO RELATED APPLICATIONS

This application is a national stage application (under 35 U.S.C. § 371) of PCT/EP2017/084284, filed Dec. 22, 2017, incorporated herein by reference, which claims benefit of European Application No. 16207059.3, filed Dec. 28, 2016.

The present invention relates to a composition, especially a polycarbonate composition, for production of a thermoplastic moulding compound, to a process for producing the thermoplastic moulding compound, to the moulding compound itself, to the use of the composition or moulding compound for production of mouldings, and to the mouldings themselves.

Polycarbonate compositions have been known for a long time, and these materials are used to produce mouldings for a wide variety of applications, for example in the automobile sector, for rail vehicles, for the construction sector, in the electrical/electronics sector and in domestic appliances. The quantity and nature of the constituents in the formulation can be varied to achieve a wide range of modification of the compositions, and thus also of the resultant mouldings, so that the thermal, rheological and mechanical properties of these are appropriate to the requirements of each application.

Some polymer components present as further constituents alongside polycarbonate, such as vinyl (co)polymers, have partial compatibility with polycarbonate. Therefore, phase compatibilizers are frequently used, for example in the form of copolymers containing functional groups, in order to improve mechanical properties of the mouldings produced from the thermoplastic moulding compounds.

DE 3413751 A1 discloses thermoplastic moulding compounds comprising polycarbonate, graft polymers, rubber-free copolymers and optionally copolymer rubbers, and optionally standard additives, which are characterized in that the rubber-free copolymers incorporate epoxy compounds in polymerized form. The mouldings produced from the moulding compounds are notable for a high thermal stress limit, improved heat distortion resistance coupled with good toughness, and a homogeneous matt surface quality.

EP 1 069 156 B1 discloses flame-retardant thermoplastic compositions comprising polycarbonate, styrene graft polymer, styrene copolymer, SAN-grafted polycarbonate or polycarbonate-grafted SAN and phosphoric esters. The compositions have improved flame retardancy and improved mechanical properties, and are suitable for housings for electrical or electronic appliances.

U.S. Pat. No. 4,885,335 A discloses compositions comprising polycarbonate, an acrylonitrile-styrene-acrylate copolymer and a glycidyl methacrylate copolymer for gloss reduction.

EP 0 375 941 A1 discloses a thermoplastic having good physical properties, composed of polycarbonate, ABS and a glycidyl methacrylate copolymer. The mouldings have low surface gloss.

EP 0 549 205 B1 discloses polycarbonate resin compositions having low gloss and excellent mechanical strength. The compositions comprise polycarbonate, a styrene resin, an addition polymer having units derived from glycidyl methacrylate and an organic acid.

For instance, EP 1 854 842 B1 discloses styrene resin compositions comprising polycarbonate, a styrene-based resin, for example ABS, a modified styrene-based polymer containing vinyl-based monomer units with functional groups. The compositions are suitable for processing by injection moulding, have excellent mechanical properties, flowability, chemical resistance and galvanizability, and can easily be rendered flame-retardant.

The prior art documents disclose that the use of a polymer component having functional groups, as well as good mechanical properties, gives a reduction in surface gloss. It is not shown how the gloss can be kept at a high level in spite of use of such a phase compatibilizer. Furthermore, there is no suggestion in the prior art of good stability of the high gloss even at elevated processing temperatures in the injection moulding method.

It was thus desirable to provide compositions and moulding compounds produced therefrom that permit the production of moulding compounds having good mechanical properties, particularly having good low-temperature notched impact resistance, where the mouldings have very high surface gloss and good processing stability. Processing stability should be understood to mean that a high level of gloss is also achieved when the mouldings are produced at elevated temperatures, for instance 300° C., by the injection moulding method and there is no significant variation in the level of gloss between an injection moulding temperature of 260° C. and 300° C. The level of gloss, in the case of an injection moulding temperature of 260° C. or else 300° C., should be at least 90 at an observation angle of 60° and should vary by less than 8% within this temperature interval. Preferably, the level of gloss, in the case of an injection moulding temperature of 260° C. or else 300° C., should be at least 95 at an observation angle of 60° and should vary by less than 5% within this temperature interval.

It has now been found that, surprisingly, a composition and a thermoplastic moulding compound produced therefrom, wherein said composition comprises or consists of the following constituents:

A) 30% to 90% by weight, preferably 40% to 80% by weight, more preferably 50% to 75% by weight, of at least one polymer selected from the group consisting of aromatic polycarbonate, aromatic polyester carbonate and aromatic polyester, B) 5% to 65% by weight, preferably 10% to 50% by weight, more preferably 15% to 45% by weight, of polymer free of epoxy groups, consisting of
  B1) rubber-modified vinyl (co)polymer prepared by the emulsion polymerization method using a redox initiator system consisting of an organic oxidizing agent and a reducing agent and
  B2) optionally rubber-free vinyl (co)polymer, C) 0.5% to 10% by weight, preferably 1% to 8% by weight, more preferably 2% to 7% by weight, of a polymer containing structural elements deriving from styrene and an epoxy-containing vinyl monomer, D) 0% to 20% by weight, preferably 0.1% to 15% by weight and more preferably 0.2% to 10% by weight of one or more further additives, wherein component C has a weight ratio of structural elements deriving from
styrene to those deriving from epoxy-containing vinyl monomer of 100:1 to 1:1, preferably of 10:1 to 1:1, further preferably of 5:1 to 1:1, most preferably of 3:1 to 1:1,
has the desired profile of properties.

Component A

Component A) is a thermoplastic or a mixture of different thermoplastics selected from at least one polymer from the group consisting of polycarbonate, polyester carbonate and polyester.

In a preferred embodiment, component A) is selected from at least one polymer from the group consisting of polycarbonate and polyester carbonate, further preferably selected from at least one polymer from the group consisting of aromatic polycarbonate and aromatic polyester carbonate, and in a most preferred embodiment component A) is aromatic polycarbonate or a mixture of different aromatic polycarbonates.

Polycarbonates for the purposes of the present invention are either homopolycarbonates or copolycarbonates and/or polyester carbonates; the polycarbonates can, as is known, be linear or branched. It is also possible in accordance with the invention to use mixtures of polycarbonates.

The thermoplastic polycarbonates, including the thermoplastic aromatic polyester carbonates, have average molecular weights Mw determined by GPC (gel permeation chromatography in methylene chloride with a polycarbonate standard) of 15 000 g/mol to 50 000 g/mol, preferably of 20 000 g/mol to 35 000 g/mol, more preferably of 23 000 g/mol to 33 000 g/mol.

A portion of up to 80 mol %, preferably from 20 mol % to 50 mol %, of the carbonate groups in the polycarbonates used in accordance with the invention may have been replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. For the purposes of the present invention, they are covered by the umbrella term "thermoplastic aromatic polycarbonates".

The polycarbonates are prepared in a known manner from diphenols, carbonic acid derivatives, optionally chain terminators and optionally branching agents, but for preparation of the polyester carbonates a portion of the carbonic acid derivatives is replaced by aromatic dicarboxylic acids or derivatives of the dicarboxylic acids according to the extent to which the carbonate structural units are to be replaced by aromatic dicarboxylic ester structural units in the aromatic polycarbonates.

Dihydroxyaryl compounds suitable for the preparation of polycarbonates are those of the formula (1)

HO—Z—OH  (1)

in which

Z is an aromatic radical which has from 6 to 30 carbon atoms and may contain one or more aromatic rings, may be substituted and may contain aliphatic or cycloaliphatic radicals or alkylaryl radicals or heteroatoms as bridging elements.

Z in formula (1) is preferably a radical of the formula (2)

(2)

in which $R^6$ and $R^7$ are independently H, $C_1$- to $C_{18}$-alkyl-, $C_1$- to $C_{18}$-alkoxy, halogen such as Cl or Br or in each case optionally substituted aryl or aralkyl preferably H or $C_1$- to $C_{12}$-alkyl, more preferably H or $C_1$- to $C_8$-alkyl and even more preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else is $C_6$- to $C_{12}$-arylene, optionally fused to other aromatic rings containing heteroatoms.

X is preferably a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or is a radical of the formula (2a)

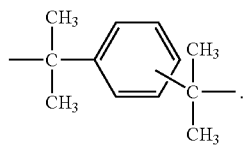

(2a)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and ring-alkylated and ring-halogenated compounds derived therefrom.

Examples of diphenols suitable for the preparation of the polycarbonates to be used in accordance with the invention are hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and alkylated, ring-alkylated and ring-halogenated compounds derived therefrom.

Preferred diphenols are 4,4'-dihydroxydiphenyl, 2,2-bis(4-hydroxyphenyl)-1-phenylpropene, 1,1-bis(4-hydroxyphenyl)phenylethane, 2,2-bis(4-hydroxyphenyl)propene, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane (bisphenol A), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC). 2,2-Bis(4-hydroxyphenyl)propane (bisphenol A) is especially preferred.

These and further suitable diphenols are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

In the case of the homopolycarbonates, only one diphenol is used; in the case of copolycarbonates, two or more diphenols are used. The diphenols used, and also all of the other chemicals and auxiliaries added to the synthesis, may be contaminated by the impurities arising during the synthesis, handling and storage thereof. However, it is desirable to use raw materials of the highest possible purity.

The monofunctional chain terminators needed to regulate the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction together with the bisphenoxide(s) or else added to the synthesis at any time, provided that phosgene or chlorocarbonic acid end groups are still present in the reaction mixture, or, in the case of the acid chlorides and chlorocarbonic esters as chain terminators, provided that sufficient phenolic end groups of the polymer being formed are available. However, it is preferable that the chain terminator(s) is/are added after the phosgenation procedure at a location/juncture at which phosgene is no longer present but the catalyst has not yet been metered into the system, or that they are metered into the system before the catalyst or in parallel or together with the catalyst.

Any branching agents or branching agent mixtures to be used are added to the synthesis in the same manner, but usually before the chain terminators. Compounds typically used are trisphenols, quaterphenols or acyl chlorides of tri- or tetracarboxylic acids, or else mixtures of the polyphenols or of the acyl chlorides.

Examples of some of the compounds that can be used as branching agents having three, or more than three, phenolic hydroxyl groups are phloroglucinol, 4,6-dimethyl-2,4,6-tri (4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl) phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The quantity of the branching agents optionally to be used is from 0.05 mol % to 2 mol %, again based on moles of diphenols used in the particular case.

The branching agents can either be used as initial charge together with the diphenols and the chain terminators in the aqueous alkaline phase or added in solution in an organic solvent before the phosgenation procedure.

All these measures for preparation of the polycarbonates are familiar to those skilled in the art.

Examples of aromatic dicarboxylic acids suitable for the preparation of the polyester carbonates are orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the diacyl dihalides and the dialkyl dicarboxylates, especially the diacyl dichlorides and the dimethyl dicarbonates.

Replacement of the carbonate groups by the aromatic dicarboxylic ester groups is in essence stoichiometric, and also quantitative, and the molar ratio of the reactants is therefore also maintained in the finished polyester carbonate. The aromatic dicarboxylic ester groups can be incorporated either randomly or blockwise.

Preferred modes of preparation of the polycarbonates to be used in accordance with the invention, including the polyester carbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the first case the acid derivatives used are preferably phosgene and optionally diacyl dichlorides; in the latter case they are preferably diphenyl carbonate and optionally dicarboxylic diesters. Catalysts, solvents, workup, reaction conditions, etc. have been sufficiently well described and disclosed both for the preparation of polycarbonate and for the preparation of polyester carbonate.

The polycarbonates suitable in accordance with the invention as component A have an OH end group concentration of 10 to 1000 ppm, preferably 20 to 500 ppm, more preferably 30 to 150 ppm.

The OH end group concentration is determined by photometric means according to Horbach, A.; Veiel, U.; Wunderlich, H., Makromolekulare Chemie 1965, volume 88, p. 215-231.

Useful polyesters in a preferred embodiment are aromatic, and they are further preferably polyalkylene terephthalates.

In particularly preferred embodiments, these are reaction products of aromatic dicarboxylic acids or reactive derivatives thereof, such as dimethyl esters or anhydrides, and aliphatic, cycloaliphatic or araliphatic diols and also mixtures of these reaction products.

Particularly preferred aromatic polyalkylene terephthalates contain at least 80% by weight, preferably at least 90% by weight, based on the dicarboxylic acid component, of terephthalic acid radicals and at least 80% by weight, preferably at least 90% by weight, based on the diol component, of ethylene glycol and/or butane-1,4-diol radicals.

The preferred aromatic polyalkylene terephthalates may contain, as well as terephthalic acid radicals, up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred aromatic polyalkylene terephthalates may contain not only ethylene glycol and/or butane-1,4-diol radicals but also up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(j-hydroxyethoxy)benzene, 2,2-bis (4-hydroxycyclohexyl)propane, 2,4-dihydroxy-1,1,3,3-tetramethylcyclobutane, 2,2-bis(4-β-hydroxyethoxyphenyl) propane and 2,2-bis(4-hydroxypropoxyphenyl)propane (DE-A 2 407 674, 2 407 776, 2 715 932).

The aromatic polyalkylene terephthalates may be branched through incorporation of relatively small amounts of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane and trimethylolpropane, and pentaerythritol.

Particular preference is given to aromatic polyalkylene terephthalates which have been prepared solely from terephthalic acid and the reactive derivatives thereof (e.g. the dialkyl esters thereof) and ethylene glycol and/or butane-1, 4-diol, and to mixtures of these polyalkylene terephthalates.

Preferred mixtures of aromatic polyalkylene terephthalates contain 1% to 50% by weight, preferably 1% to 30% by weight, of polyethylene terephthalate and 50% to 99% by weight, preferably 70% to 99% by weight, of polybutylene terephthalate.

The preferably used aromatic polyalkylene terephthalates have a viscosity number of 0.4 to 1.5 dl/g, preferably 0.5 to 1.2 dl/g, measured in phenol/o-dichlorobenzene (1:1 parts by weight) in a concentration of 0.05 g/ml according to ISO 307 at 25° C. in an Ubbelohde viscometer.

The aromatic polyalkylene terephthalates can be prepared by known methods (see, for example, Kunststoff-Handbuch [Plastics Handbook], volume VIII, p. 695 et seq., Carl-Hansr-Verlag, Munich 1973).

A most preferred component A is aromatic polycarbonate based on bisphenol A.

Component B

Component B consists of B1 and optionally B2. If component B consists of B1 and B2, the proportion of B1 in component B is at least 20% by weight, preferably at least 30% by weight, more preferably at least 40% by weight. Both component B1 and components B2 do not contain any epoxy groups.

Component B1

Component B1 comprises rubber-containing graft polymers, prepared by the emulsion polymerization method, of, in a preferred embodiment, B1.1) 5% to 95% by weight, preferably 10% to 70% by weight, more preferably 20% to 60% by weight, based on component B1, of a mixture of B1.1.1) 65% to 85% by weight, preferably 70% to 80% by weight, based on B1.1, of at least one monomer selected from the group of the vinylaromatics (for example styrene, α-methylstyrene), ring-substituted vinylaromatics (for example p-methylstyrene, p-chlorostyrene) and (C1-C8)-alkyl methacrylates (for example methyl methacrylate, ethyl methacrylate)

and

B1.1.2) 15% to 35% by weight, preferably 20% to 30% by weight, based on B1.1, of at least one monomer selected from the group of the vinyl cyanides (for example unsaturated nitriles such as acrylonitrile and methacrylonitrile), (C1-C$_8$)-alkyl (meth)acrylates (for example methyl methacrylate, n-butyl acrylate, tert-butyl acrylate) and derivatives (for example anhydrides and imides) of unsaturated carboxylic acids (for example maleic anhydride and N-phenylmaleimide)

onto

B1.2) 95% to 5% by weight, preferably 90% to 30% by weight, more preferably 80% to 40% by weight, based on component B1, of at least one elastomeric graft base.

The graft base preferably has a glass transition temperature <0° C., more preferably <−20° C., more preferably <−60° C.

Unless expressly stated otherwise in the present application, the glass transition temperature is determined for all components by differential scanning calorimetry (DSC) according to DIN EN 61006 (1994 version) at a heating rate of 10 K/min with determination of Tg as the midpoint temperature (tangent method).

The graft particles in component B1 preferably have a median particle size (D50) of 0.05 to 1 μm, preferably of 0.1 to 0.6 μm, more preferably of 0.2 to 0.5 μm.

The median particle size d50 is the diameter above and below which 50% by weight of the particles respectively lie. Unless expressly stated otherwise in the present application, it is determined by means of ultracentrifuge measurement (W. Scholtan, H. Lange, Kolloid, Z. und Z. Polymere 250 (1972), 782-1796).

Preferred monomers B1.1.1 are selected from at least one of the monomers styrene, α-methylstyrene and methyl methacrylate; preferred monomers B1.1.2 are selected from at least one of the monomers acrylonitrile, maleic anhydride and methyl methacrylate.

Particularly preferred monomers are B1.1.1 styrene and B1.1.2 acrylonitrile.

Graft bases B1.2 suitable for the graft polymers B1 are, for example, diene rubbers, diene-vinyl block copolymer rubbers, EP(D)M rubbers, i.e. those based on ethylene/ propylene and optionally diene, acrylate rubbers, polyurethane rubbers, silicone rubbers, chloroprene rubbers and ethylene/vinyl acetate rubbers, and also mixtures of such rubbers or silicone-acrylate composite rubbers in which the silicone and acrylate components are chemically joined to one another (for example by grafting).

Preferred graft bases B1.2 are diene rubbers (for example based on butadiene or isoprene), diene-vinyl block copolymer rubbers (for example based on butadiene and styrene blocks), copolymers of diene rubbers with further copolymerizable monomers (for example according to B1.1.1 and B1.1.2) and mixtures of the aforementioned rubber types.

Particular preference is given to pure polybutadiene rubber and styrene-butadiene block copolymer rubber.

The gel content of the graft polymers is at least 40% by weight, preferably at least 80% by weight, more preferably at least 90% by weight (measured in acetone).

The gel content of the graft polymers, unless otherwise stated in the present invention, is determined at 25° C. as the insoluble fraction in acetone as the solvent (M. Hoffmann, H. Krömer, R. Kuhn, Polymeranalytik I und II [Polymer Analysis I and II], Georg Thieme-Verlag, Stuttgart 1977).

The graft polymers B1 are prepared by free-radical polymerization by the emulsion polymerization method.

This involves preparing the graft polymer B1 to be used in accordance with the invention by redox initiation.

Redox initiator systems suitable in accordance with the invention consist of an organic oxidizing agent and a reducing agent, and heavy metal ions may additionally be present in the reaction medium; preference is given to working without heavy metal ions.

Organic oxidizing agents suitable in accordance with the invention are, for example and with preference, di-tert-butyl peroxide, cumene hydroperoxide, dicyclohexyl percarbonate, tert-butyl hydroperoxide, p-menthane hydroperoxide or mixtures thereof, more preferably cumene hydroperoxide and tert-butyl hydroperoxide, most preferably tert-butyl hydroperoxide. In place of the organic oxidizing agent, it is also possible to use $H_2O_2$ as oxidizing agent in the redox initiator system.

Reducing agents usable in accordance with the invention are preferably water-soluble compounds having reducing action, preferably selected from the group of the salts of sulfinic acid, salts of sulfurous acid, sodium dithionite, sodium sulfite, sodium hyposulfite, sodium hydrogensulfite, ascorbic acid and salts thereof, Rongalit™ C (sodium formaldehydesulfoxylate), mono- and dihydroxyacetone, sugars (e.g. glucose or dextrose). It is also possible in principle, for example, to use iron(II) salts, for example iron(II) sulfate, tin(II) salts, for example tin(II) chloride, titanium(III) salts such as titanium(III) sulfate; however, preference is given to using no metal salts of this kind.

Particularly preferred reducing agents are dextrose, ascorbic acid/salts or sodium formaldehydesulfoxylate (Rongalit™ C); ascorbic salts are most preferred.

In general, the polymerization initiators are used in an amount of 0.05% to 1% by weight, based on the graft monomers (B1.1).

The preparation of component B1 of the invention is described, for example, in DE 198 28 538 A1.

As a result of the preparation, graft polymer B1 generally contains free copolymer of B1.1.1 and B1.1.2, i.e. copolymer not chemically bonded to the graft base, which has the feature that it can be dissolved in suitable solvents (e.g. acetone).

Component B1 preferably comprises a free copolymer of B1.1.1 and B1.1.2 having a weight-average molecular weight (Mw) determined by gel permeation chromatography with polystyrene as standard of preferably 30 000 to 150 000 g/mol, more preferably of 40 000 to 120 000 g/mol.

Component B2

The composition may optionally comprise, as a further component B2, rubber-free vinyl (co)polymers, preferably of at least one monomer from the group of the vinylaromatics, vinyl cyanides (unsaturated nitriles), (C1 to C8)alkyl (meth)acrylates, and unsaturated carboxylic acids and derivatives (such as anhydrides and imides) of unsaturated carboxylic acids.

Especially suitable as component B2 are (co)polymers of
B2.1 50% to 99% by weight, preferably 65% to 85% by weight, particularly preferably 70% to 80% by weight based on the (co)polymer B2 of at least one monomer selected from the group of the vinylaromatics (for example styrene, α-methylstyrene), ring-substituted vinylaromatics (for example p-methylstyrene, p-chlorostyrene) and (C1-C8)-alkyl (meth)acrylates (for example methyl methacrylate, n-butyl acrylate, tert-butyl acrylate) and
B2.2 1% to 50% by weight, preferably 15% to 35% by weight, particularly preferably 20% to 30% by weight based on the (co)polymer B2 of at least one monomer selected from the group of the vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B2 are resinous, thermoplastic and rubber-free. Particular preference is given to the copolymer of B2.1 styrene and B2.2 acrylonitrile.

(Co)polymers B2 of this kind are known and can be prepared by free-radical polymerization, especially by emulsion, suspension, solution or bulk polymerization.

The (co)polymers B2 have a weight-average molecular weight (Mw) determined by gel permeation chromatography with a polystyrene standard of preferably 50 000 to 250 000 g/mol, particularly preferably of 70 000 to 200 000 g/mol, particularly preferably of 80 000 to 170 000 g/mol.

Component C

The composition comprises, as component C, at least one polymer containing structural units derived from styrene and
structural units derived from a vinyl monomer containing epoxy groups.

In the context of the present application, epoxy groups are understood to mean the following structural units:

(3)

where R1, R2 and R3 are independently hydrogen or methyl, preferably at least two of the R1, R2 and R3 radicals are hydrogen, and more preferably all R1, R2 and R3 radicals are hydrogen.

Such vinyl monomers containing epoxy groups to be used for preparation of the component C are, for example, glycidyl acrylate, glycidyl methacrylate, glycidyl ethacrylate, glycidyl itaconate, allyl glycidyl ether, vinyl glycidyl ether, vinylbenzyl glycidyl ether or propenyl glycidyl ether.

Glycidyl methacrylate is especially preferred.

In a preferred embodiment, component C comprises a polymer prepared by copolymerization of styrene and at least one styrene-copolymerizable vinyl monomer containing epoxy groups.

In a preferred embodiment, in the preparation of these polymers of component C, as well as styrene and the vinyl monomer containing epoxy groups, at least one further vinyl monomer free of epoxy groups which is copolymerizable with these monomers is used. These further vinyl monomers are selected from the group consisting of vinylaromatics (for example α-methylstyrene), ring-substituted vinylaromatics (for example p-methylstyrene, p-chlorostyrene), (C1-C8)-alkyl (meth)acrylates (for example methyl methacrylate, n-butyl acrylate, tert-butyl acrylate), vinyl cyanides (for example acrylonitrile and methacrylonitrile), unsaturated carboxylic acids (for example maleic acid and N-phenylmaleic acid) and derivatives of unsaturated carboxylic acids (for example maleic anhydride and N-phenylmaleimide).

Especially preferably, the further copolymerizable vinyl monomer used is acrylonitrile.

In a further preferred embodiment, component C comprises at least one polymer containing structural units derived from styrene, acrylonitrile and glycidyl methacrylate, and in a particularly preferred embodiment a polymer consisting of structural units derived from styrene, acrylonitrile and glycidyl methacrylate.

If, aside from structural units derived from styrene and derived from the vinyl monomer containing epoxy groups, structural units derived from a further vinyl monomer free of epoxy groups, as described above, are additionally present in component C, the weight ratio between the structural units derived from styrene and the structural units derived from the further vinyl monomer is in the range from 99:1 to 50:50, preferably in the range from 85:15 to 60:40.

In a further embodiment, component C contains structural units derived from styrene, acrylonitrile and glycidyl methacrylate, where the weight ratio of the styrene-derived structural units to acrylonitrile-derived structural units is 99:1 to 50:50, preferably 85:15 to 60:40.

In a preferred embodiment, component C comprises a polymer prepared by copolymerization from styrene, acrylonitrile and glycidyl methacrylate, where the weight ratio of styrene to acrylonitrile is 99:1 to 50:50, preferably 85:15 to 60:40.

The preparation of the polymers of component C from styrene and at least one styrene-copolymerizable vinyl monomer containing epoxy groups is preferably effected by free-radically initiated polymerization, for example by the known method of solution polymerization in organic hydrocarbons. Preference is given here to observing such conditions that hydrolysis of the epoxy groups is at least largely avoided. Suitable and preferred conditions for this purpose are, for example, low contents of polar solvents such as water, alcohol, acids or bases, and working in solvents from the group of the organic hydrocarbons that are inert toward epoxy groups, for example toluene, ethylbenzene, xylene, high-boiling aliphatics, esters or ethers.

An alternative preparation process is the likewise known method of thermally or free-radically initiated, preferably continuous bulk polymerization at temperatures of preferably 40 to 150° C., especially preferably 80 to 130° C., and with optionally only partial monomer conversion, such that the polymer obtained occurs as a solution in the monomer system.

Component C may also be a block or graft polymer containing structural units derived from styrene and at least one vinyl monomer containing epoxy groups. Block or graft polymers of this kind are prepared, for example, by free-radically initiated polymerization of styrene and optionally further copolymerizable vinyl monomers in the presence of a polymer selected from the group consisting of polycarbonate, polyester, polyester carbonate, polyolefin, polyacrylate and polymethacrylate.

In a preferred embodiment, block or graft polymers of this kind that are used here are prepared by free-radically initiated polymerization of styrene, a vinyl monomer containing epoxy groups and optionally further copolymerizable vinyl monomers free of epoxy groups in the presence of a polymer selected from the group consisting of polycarbonate, polyester, polyester carbonate, polyolefin, polyacrylate and polymethacrylate. These polymers may likewise contain epoxy groups, and these in the case of the polyolefins, polyacrylates and polymethacrylates are preferably obtained by copolymerization with vinyl monomers containing epoxy groups.

Vinyl monomers containing epoxy groups and further copolymerizable vinyl monomers free of epoxy groups that are used in block or graft polymers of this kind are the abovementioned monomers.

In a particularly preferred embodiment, a block or graft polymer prepared by free-radically initiated polymerization of styrene, glycidyl methacrylate and acrylonitrile in the presence of a polycarbonate, where styrene and acrylonitrile are used in a weight ratio of 85:15 to 60:40, is used.

Block or graft polymers of this kind are obtained, for example, by swelling or dissolving the abovementioned polymer selected from the group consisting of polycarbonate, polyester, polyester carbonate, polyolefin, polyacrylate and polymethacrylate in the monomer mixture of styrene and optionally styrene-copolymerizable vinyl monomers, optionally and preferably including vinyl monomer containing epoxy groups, for which purpose it is optionally also possible to use a preferably nonaqueous cosolvent, and reacting it with an organic peroxide as initiator for a free-radical polymerization by increasing the temperature, followed by melt compounding.

In another embodiment, it is possible to use as component C a block or graft polymer prepared by reaction of a polymer containing structural units derived from styrene and from a vinyl monomer containing epoxy groups with a polymer containing OH groups, selected from the group consisting of polycarbonate, polyester and polyester carbonate.

In the preparation of the block or graft polymers, it may be the case that not all polymer chains selected from the group consisting of polycarbonate, polyester, polyester carbonate, polyolefin, polyacrylate and polymethacrylate form block or graft polymers with styrene and the optional further vinyl monomers.

Component C in these cases is also understood to mean those polymer mixtures which are obtained by the preparation methods described and in which homopolymers are also present, selected from polycarbonate, polyester, polyester carbonate, polyolefin, polyacrylate and polymethacrylate and the styrene (co)polymers obtained from styrene and the optional further styrene-copolymerizable vinyl monomers.

Component C may also be a mixture of two or more of the components described above.

Component C has a weight ratio of structural elements deriving from styrene to structural elements deriving from epoxy-containing vinyl monomer of 100:1 to 1:1, preferably of 10:1 to 1:1, further preferably of 5:1 to 1:1, most preferably of 3:1 to 1:1.

Component C has an epoxy content measured according to ASTM D 1652-11 (2011 version) in dichloromethane of 0.1% to 5% by weight, preferably 0.3% to 3% by weight, more preferably 1% to 3% by weight.

Commercially available graft or block polymers which can be used as component C are, for example, Modiper™ CL430-G, Modiper™ A 4100 and Modiper™ A 4400 (each NOF Corporation, Japan). Preference is given to using Modiper™ CL430-G.

Component D

The composition may comprise as component D one or more further additives preferably selected from the group consisting of flame retardants, anti-drip agents, flame retardant synergists, lubricants and demoulding agents (for example pentaerythritol tetrastearate), nucleating agents, antistats, conductivity additives, stabilizers (e.g. hydrolysis, thermal ageing and UV stabilizers, and also transesterification inhibitors and acid/base quenchers), flowability promoters, compatibilizers, further impact modifiers other than component B (with or without core-shell structure), further polymeric constituents (for example functional blend partners), fillers and reinforcers (for example carbon fibres, talc, mica, kaolin, $CaCO_3$) and also dyes and pigments (for example titanium dioxide or iron oxide).

In a preferred embodiment, the composition is free from flame retardants, anti-drip agents, flame retardant synergists and smoke inhibitors.

In a likewise preferred embodiment, the composition is free from fillers and reinforcing materials.

In a particularly preferred embodiment, the composition is free from flame retardants, anti-drip agents, flame retardant synergists, smoke inhibitors and fillers and reinforcing materials.

Component D may comprise impact modifiers other than component B1, for example impact modifiers produced by bulk, solution or suspension polymerization, or impact modifiers produced by emulsion polymerization using an initiator system other than the redox initiator systems that are used in the production of component B1.

Suitable initiator systems of this kind are, for example, persulfate compounds, for example ammonium peroxodisulfate, potassium peroxodisulfate, sodium peroxodisulfate or mixtures thereof.

The median particle size (d50) of these further impact modifiers prepared by emulsion polymerization is 0.05 to 1 μm, preferably from 0.1 to 0.6 μm, more preferably from 0.2 to 0.5 μm.

Preferably, impact modifiers of the ABS type other than component B1 are used in component D.

The impact modifiers optionally present in component D, prepared by bulk, solution or suspension polymerization, have a median rubber particle diameter d50 of 0.1 to 2 μm, preferably of 0.3 to 1.5 μm, most preferably of 0.4 to 0.7 μm.

If such further impact modifiers prepared by bulk, solution or suspension polymerization are present in component D, the proportion thereof is preferably not more than 50% by weight, further preferably not more than 20% by weight, more preferably not more than 10% by weight, most preferably 0% by weight, based in each case on the sum total of the impact modifiers prepared by bulk, solution or suspension polymerization and component B1.

More preferably, the compositions are free of those impact modifiers prepared by bulk, solution or suspension polymerization.

If further impact modifiers other than component B1, prepared by emulsion polymerization using an initiator system other than the redox initiator systems which are used in the preparation of component B1 are present in component D, the proportion thereof is preferably not more than 30% by weight, further preferably not more than 20% by weight, more preferably not more than 10% by weight, most preferably 0% by weight, based in each case on the sum total of all impact modifiers prepared by emulsion polymerization.

Further preferably, component D does not contain any impact modifiers other than component B1.

In a preferred embodiment, the composition comprises at least one polymer additive selected from the group consisting of lubricants/demoulding agents and stabilizers.

In a preferred embodiment, the composition comprises pentaerythritol tetrastearate as demoulding agent.

In a preferred embodiment, the composition comprises, as stabilizer, at least one representative selected from the group consisting of sterically hindered phenols, organic phosphites, sulfur-based co-stabilizers and organic and inorganic Brønsted acids.

In a particularly preferred embodiment, the composition comprises, as stabilizer, at least one representative selected from the group consisting of octadecyl 3-(3,5-di-tert-butyl-4-hydroxyphenyl)propionate and tris(2,4-di-tert-butylphenyl) phosphite.

In an especially preferred embodiment, the composition comprises, as stabilizer, a combination of octadecyl 3-(3,5-di-tert-butyl-4-hydroxyphenyl)propionate and tris(2,4-di-tert-butylphenyl) phosphite.

Further preferred compositions comprise pentaerythritol tetrastearate as demoulding agent, and a combination of octadecyl 3-(3,5-di-tert-butyl-4-hydroxyphenyl)propionate and tris(2,4-di-tert-butylphenyl) phosphite as stabilizer.

Production of the Moulding Compounds and Mouldings

The compositions according to the invention can be used to produce thermoplastic moulding compounds.

The thermoplastic moulding compounds according to the invention can be produced for example by mixing the respective constituents of the compositions and melt compounding and melt extruding the resulting mixture at temperatures of preferably 200° C. to 320° C., more preferably at 240° C. to 300° C., in customary apparatuses, for example internal kneaders, extruders and twin-shaft screw systems, in a known manner. For the purposes of this application, this process is generally termed compounding.

The term moulding compound therefore means the product that is obtained when the constituents of the composition are compounded in the melt and extruded in the melt.

The individual constituents of the compositions can be mixed in known fashion, either successively or simultaneously, either at about 20° C. (room temperature) or at a higher temperature. It is therefore possible by way of example that some of the constituents are metered into the system by way of the main intake of an extruder and that the remaining constituents are introduced subsequently in the compounding process by way of an ancillary extruder.

The invention also provides a process for producing the moulding compounds of the invention.

The moulding compounds of the invention can be used for production of mouldings of any type. These can by way of example be produced by injection moulding, extrusion and blow-moulding processes. Another type of processing is the production of mouldings by thermoforming from prefabricated sheets or films.

It is also possible to meter the constituents of the compositions directly into an injection moulding machine or into an extrusion unit and to process them to give mouldings.

Examples of such mouldings that can be produced from the compositions and moulding compounds according to the invention are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automobile sector. The compositions and moulding compounds according to the invention are also suitable for production of the following moulded articles or mouldings: internal fitout parts for rail vehicles, ships, aircraft, buses and other motor vehicles, bodywork components for motor vehicles, housings of electrical equipment containing small transformers, housings for equipment for the processing and transmission of information, housings and cladding for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

Further embodiments 1 to 42 of the present invention are described below:

1. Composition for production of a thermoplastic moulding compound, wherein the composition comprises or consists of the following constituents:
A) 30% to 90% by weight of at least one polymer selected from the group consisting of aromatic polycarbonate, aromatic polyester carbonate and aromatic polyester,
B) 5% to 65% by weight of polymer free of epoxy groups, consisting of
B1) rubber-modified vinyl (co)polymer prepared by the emulsion polymerization method using a redox initiator system consisting of an organic oxidizing agent and a reducing agent and B2) optionally rubber-free vinyl (co)polymer, C) 0.5% to 10% by weight of a polymer containing structural elements deriving from styrene and an epoxy-containing vinyl monomer, D) 0% to 20% by weight of one or more further additives, wherein component C has a weight ratio of structural elements deriving from styrene to those deriving from epoxy-containing vinyl monomer of 100:1 to 1:1.

2. Composition according to embodiment 1, wherein component C has a weight ratio of structural elements deriving from styrene to those deriving from epoxy-containing vinyl monomer of 10:1 to 1:1.

3. Composition according to embodiment 1, wherein component C has a weight ratio of structural elements deriving from styrene to those deriving from epoxy-containing vinyl monomer of 5:1 to 1:1.

4. Composition according to embodiment 1, wherein component C has a weight ratio of structural elements deriving from styrene to those deriving from epoxy-containing vinyl monomer of 3:1 to 1:1.

5. Composition according to any of the preceding embodiments, wherein component A has a proportion by weight of phenolic OH groups of 10 to 1000 ppm.

6. Composition according to any of embodiments 1 to 4, wherein component A has a proportion by weight of phenolic OH groups of 20 to 500 ppm.

7. Composition according to any of embodiments 1 to 4, wherein component A has a proportion by weight of phenolic OH groups of 30 to 150 ppm.

8. Composition according to any of the preceding embodiments, wherein component C contains structural units derived from at least one further styrene-copolymerizable vinyl monomer free of epoxy groups.

9. Composition according to embodiment 8, wherein the weight ratio of the structural units derived from styrene to those derived from the styrene-copolymerizable vinyl monomers free of epoxy groups in component C is in the range from 85:15 to 60:40.

10. Composition according to either of embodiments 8 and 9, wherein component C contains structural units derived from acrylonitrile.

11. Composition according to any of the preceding embodiments, wherein the epoxy-containing vinyl monomer is glycidyl methacrylate.

12. Composition according to any of the preceding embodiments, wherein component C has an epoxy content measured according to ASTM D 1652-11 in dichlormethane of 0.1% to 5% by weight.

13. Composition according to any of preceding embodiments 1 to 11, wherein component C has an epoxy content measured according to ASTM D 1652-11 in dichloromethane of 0.3% to 3% by weight.

14. Composition according to any of preceding embodiments 1 to 11, wherein component C has an epoxy content measured according to ASTM D 1652-11 in dichloromethane of 1% to 3% by weight.

15. Composition according to any of the preceding embodiments, wherein component C is a block or graft polymer containing structural units derived from styrene and at least one vinyl monomer containing epoxy groups.

16. Composition according to any of the preceding embodiments, wherein component C is a block or graft polymer prepared by free-radically initiated polymerization of styrene and an epoxy-containing vinyl monomer and optionally further copolymerizable vinyl monomers free of epoxy groups in the presence of a polymer selected from the group consisting of polycarbonate, polyester, polyester carbonate, polyolefin, polyacrylate and polymethacrylate.

17. Composition according to any of embodiments 1 to 15, wherein component C is a block or graft polymer prepared by reaction of an epoxy-containing styrene polymer with a polymer containing OH groups which is selected from the group consisting of polycarbonate, polyester and polyester carbonate.

18. Composition according to any of the preceding embodiments, wherein the organic oxidizing agent used in the preparation of component B1 is selected from the group consisting of di-tert-butyl peroxide, cumene hydroperoxide, dicyclohexyl percarbonate, tert-butyl hydroperoxide and p-menthane hydroperoxide, and the reducing agent is selected from the group consisting of salts of sulfinic acid, salts of sulfurous acid, sodium dithionite, sodium sulfite, sodium hyposulfite, sodium hydrogensulfite, ascorbic acid and salts thereof, sodium formaldehydesulfoxylate and mono- and dihydroxyacetone.

19. Composition according to any of the preceding embodiments, wherein the redox initiator system used in the preparation of component B1 comprises tert-butyl hydroperoxide as organic oxidizing agent and sodium ascorbate as reducing agent.

20. Composition according to any of the preceding embodiments, wherein component C does not contain a graft polymer having core-shell structure or an elastomeric graft base.

21. Composition according to any of the preceding embodiments, wherein component A is aromatic polycarbonate only.

22. Composition according to any of the preceding embodiments, wherein component A is aromatic polycarbonate based on bisphenol A only.

23. Composition according to any of the preceding embodiments, comprising 40% to 80% by weight of component A, 10% to 50% by weight of component B, 1% to 8% by weight of component C and 0.1% to 15% by weight of component D.

24. Composition according to any of the preceding embodiments, comprising 50% to 75% by weight of component A, 15% to 45% by weight of component B, 2% to 7% by weight of component C and 0.2% to 10% by weight of component D.

25. Composition according to any of the preceding embodiments, wherein component B contains at least 20% by weight of component B1.

26. Composition according to any of the preceding embodiments, wherein component B contains at least 40% by weight of component B1.

27. Composition according to any of the preceding embodiments, wherein component D comprises at least one impact modifier prepared by bulk, solution or suspension polymerization.

28. Composition according to embodiment 27, wherein the impact modifiers prepared by bulk, solution or suspension polymerization have a median particle diameter d50 of 0.4 to 0.7 μm.

29. Composition according to any of the preceding embodiments, wherein the proportion of impact modifiers prepared by bulk, solution or suspension polymerization is not more than 50% by weight, based on the sum total of the impact modifiers prepared by bulk, solution or suspension polymerization and component B1.

30. Composition according to any of the preceding embodiments, wherein the proportion of impact modifiers prepared by bulk, solution or suspension polymerization is not more than 20% by weight, based on the sum total of the impact modifiers prepared by bulk, solution or suspension polymerization and component B1.

31. Composition according to any of the preceding embodiments, free of impact modifiers prepared by bulk, solution or suspension polymerization.

32. Composition according to any of the preceding embodiments, wherein all impact modifiers prepared by emulsion polymerization according to B1 and optionally D have a median particle diameter d50 of 0.1 to 0.6 µm.

33. Composition according to any of the preceding embodiments, wherein a constituent included in component D is one or more further impact modifiers other than component B1, prepared by emulsion polymerization using an initiator system other than the redox initiator systems that are used in the preparation of component B1, and wherein the proportion thereof is not more than 30% by weight, based on the sum total of all impact modifiers prepared by emulsion polymerization.

34. Composition according to any of the preceding embodiments, free of further impact modifiers other than component B1 that are prepared by emulsion polymerization.

35. Composition according to any of the preceding embodiments, consisting to an extent of at least 80% by weight of constituents A to D.

36. Composition according to any of the preceding embodiments, consisting to an extent of at least 90% by weight of constituents A to D.

37. Composition according to any of the preceding embodiments, consisting of constituents A to D.

38. Moulding compound obtained by compounding the constituents of a composition according to any of embodiments 1 to 37 at temperatures in the range from 200 to 350° C.

39. Moulding compound obtained by compounding the constituents of a composition according to any of embodiments 1 to 37 at temperatures in the range from 240 to 320° C.

40. Moulding compound obtained by compounding the constituents of a composition according to any of embodiments 1 to 37 at temperatures in the range from 260 to 300° C.

41. Use of a composition according to any of embodiments 1 to 37 or of a moulding compound according to any of embodiments 38 to 40 for production of mouldings.

42. Moulding obtainable from a composition according to any of embodiments 1 to 37 or from a moulding compound according to any of embodiments 38 to 40.

EXAMPLES

Component A:
Linear polycarbonate based on bisphenol A having a weight-average molecular weight $M_W$ of 29 000 g/mol (determined by GPC in methylene chloride against a BPA-PC standard) and a proportion by weight of phenolic OH groups of 150 ppm.

Component B-1
Blend of
50% by weight of a graft polymer of the ABS type precipitated with magnesium sulfate in an acidic medium, prepared by grafting by the emulsion polymerization method, using potassium peroxodisulfate as polymerization initiator, of 52 parts by weight of a mixture of styrene and acrylonitrile in a % by weight ratio of 72:28 onto 48 parts by weight of a particulate crosslinked polybutadiene rubber having a particle diameter determined by ultracentrifugation of $d_{50}$=03 µm and
50% by weight of a styrene acrylonitrile copolymer prepared by bulk polymerization of styrene and acrylonitrile in a % by weight ratio of 76:24 with a weight-average molecular weight Mw of 100 kg/mol (determined by GPC at 20° C. in tetrahydrofuran with polystyrene as standard).

Owing to the nature of the workup method for the graft polymer of the ABS type used in B-1, which does not result in complete removal of the precipitation medium, this graft polymer contains Brønsted-acidic compounds as preparation-related impurity.

Component B-2:
Blend of
50% by weight of a graft polymer of the ABS type precipitated with magnesium sulfate in an acidic medium, prepared by grafting by the emulsion polymerization method, using a redox polymerization initiator system composed of tert-butyl hydroperoxide and sodium ascorbate, of 44 parts by weight of a mixture of styrene and acrylonitrile in a % by weight ratio of 72:28 onto 56 parts by weight of a particulate crosslinked polybutadiene rubber having a particle diameter determined by ultracentrifugation of $d_{50}$=0.35 µm
and
50% by weight of a styrene acrylonitrile copolymer prepared by bulk polymerization of styrene and acrylonitrile in a % by weight ratio of 76:24 with a weight-average molecular weight Mw of 100 kg/mol (determined by GPC at 20° C. in tetrahydrofuran with polystyrene as standard).

Owing to the nature of the workup method for the graft polymer of the ABS type used in B-2, which does not result in complete removal of the precipitation medium, this graft polymer contains Brønsted-acidic compounds as preparation-related impurity.

Component C:
Modiper™ CL430-G (NOF Corporation, Japan): graft copolymer containing blocks of polycarbonate and blocks of glycidyl methacrylate-styrene-acrylonitrile terpolymer, which has been obtained by free-radical graft polymerization, initiated by a peroxide, of 30% by weight of a monomer mixture of styrene, acrylonitrile and glycidyl methacrylate in a ratio of 15:6:9% by weight in the presence of 70% by weight of linear polycarbonate based on bisphenol A.

The epoxy content of component C measured according to ASTM D 1652-11 in dichloromethane is 2.4% by weight.

Component D-1:
Pentaerythritol tetrastearate as lubricant/demoulding agent

Component D-2:
Industrial carbon black, Black Pearls™ 800 (Cabot Corporation).

Components D-3:
Thermal stabilizer, Irganox™ B900 (mixture of 80% Irgafos™ 168 (tris(2,4-di-tert-butylphenyl) phosphite) and 20% Irganox™ 1076 (2,6-di-tert-butyl-4-(octadecanoxycarbonylethyl)phenol); BASF (Ludwigshafen, Germany).

Production and Testing of the Moulding Compounds According to the Invention

The components were mixed in a Werner & Pfleiderer ZSK-25 twin-screw extruder at a melt temperature of 260° C. The mouldings were produced at melt temperatures of 260° C. or 300° C. and a mould temperature of 80° C. in an Arburg 270 E injection-moulding machine.

IZOD notched impact resistance was determined according to ISO 180/A (2013 version) at temperatures in the range from room temperature to −50° C. with 10° C. intervals on ten test specimens of dimensions 80 mm×10 mm×4 mm in each case, which were manufactured at an injection moulding melt temperature of 260° C. The ductile/brittle transition temperature was ascertained as that temperature at which 20% to 80% of the test specimens exhibit ductile fracture and in each case 80-20% of the test specimens exhibit brittle fracture. If at least nine of the ten test specimens showed ductile fracture at a measurement temperature $T_1$ and only a maximum of one of the ten test specimens showed such ductile fracture at the next lowest temperature $T_2$, the ductile/brittle transition temperature was defined as the mean of these two temperatures $T=(T_1+T_2)/2$. In accordance with experience, every impact experiment with a measured notched impact resistance of at least 30 kJ/m² was rated as a ductile fracture, and every impact experiment with a measured notched impact resistance of less than 30 kJ/m² as a brittle fracture.

Surface gloss was measured in reflection at a viewing angle of 60° with a Haze-Gloss haze/gloss meter from BYK-Gardner GmbH (Geretsried, Germany) to DIN 67530 (1982 version) on test specimens of dimensions 60 mm×40 mm×4 mm manufactured at injection moulding melt temperatures of 260° C. and 300° C. A highly polished injection mould was used. In the context of the present application, the level of gloss is understood to mean the value determined under these conditions.

A measure used for the processing stability is the variability of the level of gloss with changing processing parameters (melt temperature here) in the injection moulding, and processing stability is good when a very substantially constant level of gloss is achieved over a broad processing window (interval of melt temperatures here), meaning that there is a minimum change in the level of gloss when the melt temperature changes from 260° C. to 300° C.

TABLE 1

|  | V1 | V2 | V3 | 4 |
|---|---|---|---|---|
| Component (parts by weight) | | | | |
| A | 70 | 70 | 70 | 70 |
| B-1 | 30 | | 27 | |
| B-2 | | 30 | | 27 |
| C | | | 3 | 3 |
| D-1 | 0.75 | 0.75 | 0.75 | 0.75 |
| D-2 | 0.50 | 0.50 | 0.50 | 0.50 |
| D-3 | 0.10 | 0.10 | 0.10 | 0.10 |
| Properties | | | | |
| IZOD notched impact resistance (−30° C.) [kJ/m²] | 29 | 36 | 37 | 36 |
| Ductile/brittle transition temperature in IZOD notched impact test [° C.] | −25 | −35 | −35 | −35 |
| Gloss at 60° (260° C.) | 102 | 101 | 90 | 101 |
| Gloss at 60° (300° C.) | 102 | 90 | 85 | 100 |
| Change in gloss (260° C. to 300° C.) | 0% | −11% | −6% | −1% |

The data in Table 1 show that polycarbonate compositions comprising component C and a graft polymer prepared by emulsion polymerization have an advantageous combination of good low-temperature notched impact resistance, high level of gloss and high processing stability when a redox initiator system is used in the emulsion polymerization (Example 4). If another initiator system (potassium peroxodisulfate) is used instead (V3), a lower level of gloss and higher variation in the level of gloss on alteration of the processing temperature is observed. Without component C, either low-temperature toughness is unsatisfactory (when potassium peroxodisulfate initiation is used, V1) or processing stability is inadequate (in the case of initiation with a redox system, V2).

The invention claimed is:
1. A composition for production of a thermoplastic moulding compound, wherein the composition comprises or consists of the following constituents:
   A) 30% to 90% by weight of at least one polymer selected from the group consisting of aromatic polycarbonate, and aromatic polyester carbonate,
   B) 5% to 65% by weight of polymer free of epoxy groups, consisting of
      B1) rubber-modified vinyl (co)polymer prepared by the emulsion polymerization method using a redox initiator system consisting of an organic oxidizing agent and a reducing agent and
      B2) optionally rubber-free vinyl (co)polymer,
   C) 0.5% to 10% by weight of a polymer containing structural elements deriving from styrene and an epoxy-containing vinyl monomer,
   D) 0% to 20% by weight of one or more further additives,
   wherein component C has a weight ratio of structural elements deriving from styrene to those deriving from epoxy-containing vinyl monomer of 100:1 to 1:1.
2. Composition according to claim 1, wherein component A is aromatic polycarbonate only.
3. Composition according to claim 1, wherein component A has a proportion by weight of phenolic OH groups of 10 to 1000 ppm.
4. Composition according to claim 1, wherein component C contains structural units derived from at least one further styrene-copolymerizable vinyl monomer free of epoxy groups.
5. Composition according to claim 4, wherein the weight ratio of the structural units derived from styrene to those derived from styrene-copolymerizable vinyl monomer free of epoxy groups in component C is in the range from 85:15 to 60:40.
6. Composition according to claim 1, wherein the epoxy-containing vinyl monomer is glycidyl methacrylate.
7. Compositions according to claim 1, wherein component C has an epoxy content in dichloromethane of 0.1% to 5% by weight.
8. Composition according to claim 1, wherein component C is a block or graft polymer containing structural units derived from styrene and at least one vinyl monomer containing epoxy groups.
9. Composition according to claim 1, wherein component C is a block or graft polymer prepared by free-radically initiated polymerization of styrene and an epoxy-containing vinyl monomer and optionally further copolymerizable vinyl monomers free of epoxy groups in the presence of a polymer selected from the group consisting of polycarbonate, polyester, polyester carbonate, polyolefin, polyacrylate and polymethacrylate.
10. Composition according to claim 1, wherein component C is a block or graft polymer prepared by reaction of an epoxy-containing styrene polymer with a polymer containing OH groups which is selected from the group consisting of polycarbonate, polyester and polyester carbonate.
11. Composition according to claim 1, wherein the organic oxidizing agent used in the preparation of component B1 is selected from the group consisting of di-tert-butyl peroxide, cumene hydroperoxide, dicyclohexyl percarbonate, tert-butyl hydroperoxide and p-menthane hydroperoxide, and the reducing agent is selected from the group consisting of salts of sulfinic acid, salts of sulfurous acid, sodium dithionite, sodium sulfite, sodium hypo sulfite, sodium hydrogensulfite, ascorbic acid and salts thereof, sodium formaldehydesulfoxylate and mono- and dihydroxyacetone.

12. Composition according to claim 1, wherein the redox initiator system used in the preparation of component B1 comprises tert-butyl hydroperoxide as organic oxidizing agent and sodium ascorbate as reducing agent.

13. Moulding compound obtained by compounding the constituents of a composition according to claim 1 at temperatures in the range from 200 to 350° C.

14. Use of a composition according to claim 1 for production of mouldings.

15. Moulding obtainable from a composition according to claim 1.

16. Composition according to claim 1, wherein component A has a proportion by weight of phenolic OH groups of 30 to 1000 ppm.

17. A composition for production of a thermoplastic moulding compound, wherein the composition comprises or consists of the following constituents:
   A) 30% to 90% by weight of at least one polymer selected from the group consisting of aromatic polycarbonate,
   B) 5% to 65% by weight of polymer free of epoxy groups, consisting of
      B1) rubber-modified vinyl (co)polymer prepared by the emulsion polymerization method using a redox initiator system consisting of an organic oxidizing agent and a reducing agent and
      B2) optionally rubber-free vinyl (co)polymer,
   C) 0.5% to 10% by weight of a polymer containing structural elements deriving from styrene and an epoxy-containing vinyl monomer,
   D) 0% to 20% by weight of one or more further additives,
   wherein component C has a weight ratio of structural elements deriving from styrene to those deriving from epoxy-containing vinyl monomer of 100:1 to 1:1.

18. Composition according to claim 17, wherein component A has a proportion by weight of phenolic OH groups of 30 to 1000 ppm.

19. Compositions according to claim 17, wherein component C has an epoxy content measured according to ASTM D 1652-11 in dichloromethane of 0.1% to 5% by weight.

20. Composition according to claim 17, wherein component C is a block or graft polymer containing structural units derived from styrene and at least one vinyl monomer containing epoxy groups.

* * * * *